Figure 1:
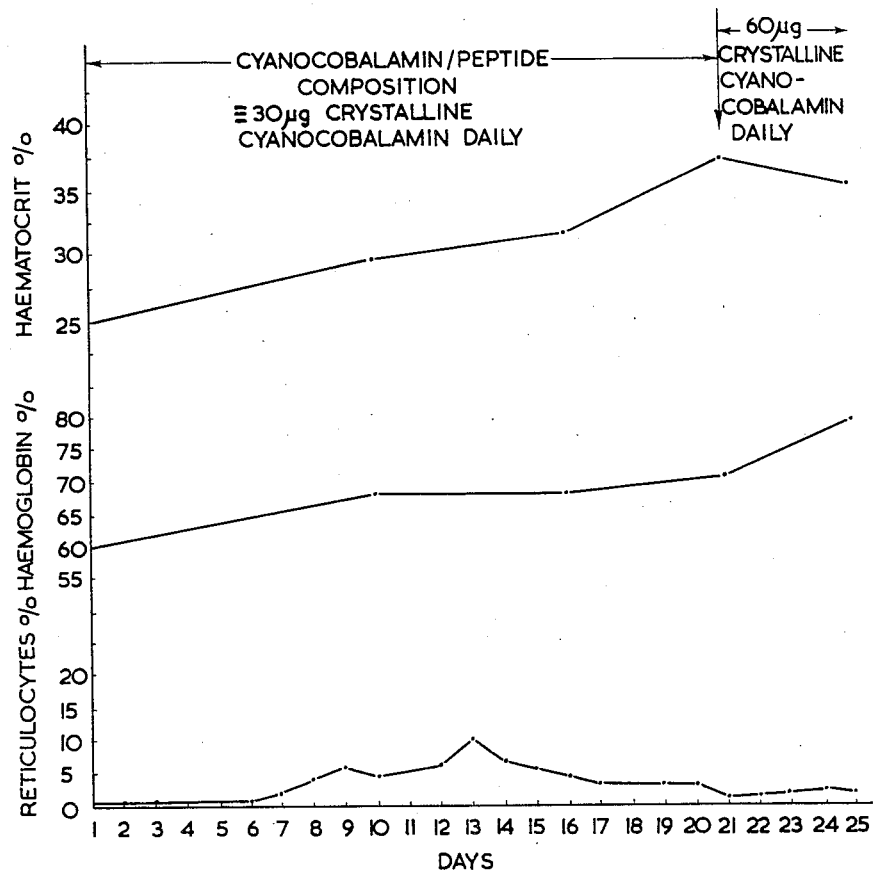

3,035,983
PROCESS FOR THE PRODUCTION OF COBALAMIN/PEPTIDE COMPOSITIONS
Roy Sherlock, Birkenhead, England, assignor to The Distillers Company Limited, Edinburgh, Scotland, a British company
Filed June 23, 1959, Ser. No. 822,262
Claims priority, application Great Britain July 18, 1958
7 Claims. (Cl. 167—81)

The present invention relates to the preparation of cobalamin-containing compositions which are effective in the treatment of pernicious anaemia when administered orally.

It is already known that cyanocobalamin and other cobalamins in which the cyano radical is replaced by another radical, such as for example, hydroxocobalamin, are of considerable therapeutic value in the treatment of pernicious anaemia, particularly when administered by injection, but that they are much less effective when they are taken orally.

In view of this it has been postulated, that the presence of another substance, often known as the "intrinsic factor" is required in cases of pernicious anaemia before effective absorption of such orally administered cobalamin can take place. From the literature on the subject it appears generally to be thought that this factor must be of a proteinaceous nature and of high molecular weight, and to be effective, capable of binding the cobalamin to prevent its destruction in the digestive tract, and thus to enhance its absorption by the body.

Various attempts have been made to isolate a suitable high molecular weight substance from animal sources which has "intrinsic factor" activity, for example extracts of hog gastric mucosa have been used with cyanocobalamin. The clinical results obtained by these preparations are not entirely satisfactory however. Other oral treatments of pernicious anaemia have been either the use of relatively large amounts of raw liver extracts or of cyanocobalamin itself. Treatment, however, of the condition of pernicious anaemia is at present almost exclusively by injection with all its dangers and inconveniences. Furthermore the preparation of injectable material is relatively difficult and expensive.

It is an object of the present invention to provide a process for the production of cobalamin-containing compositions which when orally administered, are effective against pernicious anaemia.

Accordingly, the present invention is a process for the preparation of cobalamin-peptide compositions effective on oral administration against pernicious anaemia which comprises mixing a cobalamin, as hereinafter defined, and a peptide obtained from corn steep liquor.

By the term "cobalamin" is meant cyanocobalamin, that is vitamin $B_{12}$, or a substance which can be converted to cyanocobalamin, by the action of cyanide ions, for example hydroxocobalamin. (Vitamin $B_{12b}$) or substances which differ from those in the substituents present on the benzene ring of the benzimidazole portion of the molecule, for example the 5-hydroxy benzimidazole analogue, also known as factor III, or substances in which the benzimidazole portion of the molecule is replaced by a naphthimidazole.

The chosen cobalamin should be non-toxic and effective against pernicious anaemia when administered parenterally, for example by injection, to a patient suffering from pernicious anaemia.

The peptide material with which the cobalamin is mixed is present in crude corn steep liquor and the compositions of the present invention may be formed by mixing the cobalamin with crude corn steep liquor. It is however preferred at least to filter and to heat-sterilise the corn steep liquor before mixing it with the cobalamin. It is also advantageous to subject the corn steep liquor to acid treatment before mixing with the cobalamin in order to increase the yield of peptide. This can be achieved by adjusting the pH value of the corn steep liquor to below about 3, for example to about pH 2, with mineral acid and maintaining this pH value for a period of about 1 to 2 hours, or longer if desired, before readjusting the pH value to about 7 to 7.5.

It is, however, preferred to mix the cobalamin with purified peptide material in the process of the present invention.

Purified peptide material may be obtained by extracting peptide material from an aqueous corn steep liquor solution into an organic solvent or solvent mixture such as phenol-benzene mixture, followed by re-extraction into water, for example in the presence of n-butanol or butyl acetate. These steps may be repeated as desired and the final aqueous extracts may be concentrated and freed from organic solvents under reduced pressure before mixing with the cobalamin.

If desired further treatment may be given to the aqueous extract, for example it may be treated with cyanide ions at a pH above about 6 and allowed to stand for about 1–2 hours, or longer, if desired, after which the peptide material is again extracted into an organic solvent or an organic solvent mixture followed by re-extraction into water and concentration under reduced pressure at an acid pH value to remove cyanide ions.

Purified peptide material thus obtained is then mixed with cobalamin to give the compositions of the present invention.

Sufficient cobalamin is added to give a liquid composition which, when examined by ultra violet light spectroscopy, has an optical density ratio at wavelengths 278 millimicrons and 361 millimicrons in the range 0.7 to 1.3.

Solutions prepared according to the process described above have generally been found to have a cobalamin/peptide ratio in the range of about 1:3 to 1:9.

If solid material is required from such solutions the composition containing cobalamin and peptide may be precipitated by treating the solution with an organic or inorganic precipitant, for example by the addition of ammonium sulphate to the solution or by the addition of the solution to an excess of acetone.

It is preferred to add ammonium sulphate to an aqueous solution of cobalamin/peptide composition containing about 500 micrograms of cyanocobalamin/millilitre. If acetone is used as a precipitant, one volume of the solution is preferably added rapidly to about 25 volumes of acetone. In the latter case an aqueous solution of the cobalamin peptide composition having a concentration of at least 1,000 micrograms per millilitre of cyanocobalamin and preferably of about 5,000 micrograms of cyanocobalamin per millilitre is used.

In view of the small amounts of the composition required in cases of pernicious anaemia it is convenient to mix the composition, particularly in the solid stage, with an inert solid diluent and to dispense the material in the form of tablets or capsules. Starch or mannitol for example, may be conveniently used as the inert solid diluent.

The following examples are given to illustrate the process of the present invention.

EXAMPLE 1

An aqueous solution containing 3% of corn steep liquor solids and 10% weight/volume of glucose was made up. The constituents were separately sterilised at 121° C. for 1 hour at pH 7.5 before being combined. The pH value of this solution was then adjusted to 2 and maintained at this pH for 1 hour before being readjusted to about pH 7.

The aqueous solution was then treated with 2% weight/volume phenol and was then contacted 3 times with one fifth of a volume of a 30/70 volume/volume phenol/benzene solution and the organic and aqueous layers separated. Butyl acetate was then added to the organic layer and the peptide material then extracted into water. The aqueous layer was then washed twice with one portion of the volume of n-butanol and the aqueous and the organic layers separated.

The aqueous layer was then concentrated and n-butanol removed under reduced pressure and potassium cyanide added to give a pH value of 10.

The solution was allowed to stand for 2 hours, after which 8% weight/volume ammonium sulphate was added and the aqueous solution contacted twice with one volume and twice with half a volume of n-butanol. Benzene was then added to the combined organic layers and the peptide material again extracted into water. The pH was then adjusted to 4.5 and the aqueous solution concentrated under reduced pressure to remove cyanide ions and traces of solvents. The aqueous solution was then contacted once with one fifth of the volume and twice with one tenth of the volume of phenol/benzene mixture (30/70 volume/volume) and the aqueous and organic layers separated. The organic layer was then treated with n-butanol and the peptide material again extracted into water. The aqueous layer was washed twice with ¼ of the volume of n-butanol and the aqueous and organic layer separated. The aqueous layer was then concentrated under reduced pressure to remove traces of solvents.

Sufficient crystalline cyanocobalamin was added to give a solution which, when examined by ultra violet spectroscopy, had an optical density ratio at wavelengths 278 millimicrons and 361 millimicrons in the range 0.7 and 1.3.

Various tests on the composition were then carried out as follows.

(a) *Cyanocobalamin/peptide ratio.*—This lay within the range 1:3 to 1:9.

(b) *Acetone precipitation.*—One volume of the solution prepared as above and containing 2,500 micrograms of cyanocobalamin/millilitre was added rapidly to 25 volumes of acetone. A flocculent precipitate was produced without crystals of cyanocobalamin.

Extracts prepared as described in this example but without added cyanocobalamin gave no precipitate when added to acetone under the conditions described above.

EXAMPLE 2

An aqueous solution containing 4.5% corn steep liquor solids was sterilized as described in Example 1 and the peptides contained therein were extracted into phenol/benzene solution. They were then re-extracted into water in the presence of butyl acetate and the resulting aqueous solution was concentrated and treated with excess potassium cyanide at pH 9.6. The peptides were then re-extracted into n-butanol followed by re-extraction into water in the presence of benzene. The aqueous solution thus formed was concentrated under reduced pressure at acid pH value in order to remove cyanide ions and traces of solvents.

The peptides in the solution were re-extracted to phenol/benzene and again re-extracted into aqueous solution in the presence of butanol. The aqueous solution was then washed with n-butanol and was then concentrated under reduced pressure to remove traces of solvents.

To the resulting aqueous solution was added crystalline cyanocobalamin to provide an optical density ratio at wave lengths of 278 millimicrons and 361 millimicrons in the range 0.7 to 1.3.

The solutions thus produced had a cyanocobalamin/peptide ratio in the range 1:3 to 1:9.

A portion of the solution was hydrolysed in 8 N sulphuric acid for 1 hours at 100° C. and the resulting hydrolysis was examined by paper chromatography. This examination showed that the peptide contained residues of the following amino acids. Glutamic acid, aspartic acid, glycine, valine, proline, arginine, alanine, leucine, isoleucine, phenylalanine, lysine histidine, cysteine or cystine, serine, threonine, tyrosine.

Alkaline hydrolysis in the presence of barium hydroxide showed that the peptides contained the residue of tryptophane.

EXAMPLE 3

640 gallons of corn steep liquor were diluted to about 3,700 gallons of water. This solution was adjusted to pH 7.5 and was sterilized at 235° F. for 30 minutes.

The pH value of this solution was then adjusted to 2 and maintained at this pH for 1 hour before being readjusted to about 7.5 to 8. This solution was then filtered.

The filtrate was treated with 2.5% phenol and was then extracted countercurrently with one fifth of the volume of the 30/70 volume/volume phenol/benzene solution. Butyl acetate was then added to the organic layer and peptide material then extracted into water.

The aqueous extract was then concentrated under reduced pressure to about 90 gallons.

The concentrated solution was treated with 2% weight/volume potassium cyanide and the pH value adjusted to 10. The solution was allowed to stand for 2 hours, after which 12% weight/volume ammonium sulphate was added and the aqueous solution contacted countercurrently with 2 volumes of n-butanol. Benzene was then added to the organic layer and the peptide material again extracted into water. The pH value was then adjusted to 4.5 and the aqueous solution concentrated once more under reduced pressure to remove cyanide ions and traces of solvent.

The aqueous solution was then contacted countercurrently with one third of a volume of 30/70 volume/volume phenol/benzene solution. n-Butanol was then added to the organic layer and the peptide material extracted into water. The aqueous layer was then contacted countercurrently with one quarter n-butanol then adjusted to pH 6.5 and concentrated under reduced pressure to remove traces of solvents.

Sufficient crystalline cyanocobalamin was then added to give a solution which had a cobalamin/peptide ratio of 1:9.8. This solution, when examined by U.V. spectroscopy, had an optical density ratio at wavelengths 278 millimicrons and 361 millimicrons of 1:1.25.

The solution was then freeze dried and the product was examined. The following results were obtained.

(1) Cyanocobalamin content: Percent w./w.
    (a) By U.V. spectrum _____ 9.80
    (b) By assay (*Ochromonas malhamensis*) __ 9.5
(2) Volatile matter (5 hours at 60° C. in vacuo) _ 5.13
(3) Total solids _____ 96.92
(4) Sulphate (as ammonium sulphate) _____ 1.9
(5) Peptide content (by difference) _____ 85.22
(6) Optical density ratios:

$$\frac{278 \text{ mu}}{361 \text{ mu}} = 1.22 : \frac{278 \text{ mu}}{550 \text{ mu}} = 4.15$$

$$\frac{550 \text{ mu}}{361 \text{ mu}} = 2.95 : \frac{520 \text{ mu}}{361 \text{ mu}} = 2.67$$

On hydrolysis of the product and examination for amino acids by the methods used in Example 2 the same amino residues shown in Example 2 were present in the peptide except for the absence of threonine and the presence of methionine.

EXAMPLE 4

A portion of the solid prepared as in Example 3 was dissolved in water to give a solution containing 500 micrograms of cyanocobalamin/millilitre and 60 grams of ammonium sulphate added to 100 millilitres of solution.

The mixture was stirred to dissolve the ammonium sulphate and then allowed to stand over night. The resulting precipitate was separated by filtration, and dried.

The solid had an optical density ratio at wavelengths 278 millimicrons and 361 millimicrons of 1:1 and a cyanocobalamin/peptide ratio of 1:6.0.

EXAMPLE 5

A male patient aged 76, suffering from pernicious anaemia, was treated orally with an amount daily of the freeze dried preparation described in Example 3 (mixed with an inert diluent) for 21 days equal to 30 micrograms of cyanocobalamin. During this period various estimations were carried out on the patient's blood samples and the results of these are given in Table 1 and in FIGURE 1.

Further treatment by the administration orally of 60 µg. of crystalline cyanocobalamin daily did not result in a rise in the number of reticulocytes.

It will be seen that a marked improvement in the blood picture occurred during treatment. In particular, the increase in the number of reticulocytes in the blood is evidence of a good response by the blood forming tissue of the bone marrow to the cobalamin/peptide composition.

Table 1

| Days Treatment | Reticulocytes, Percent | Haemoglobin, Percent | Haematocrit, Percent |
|---|---|---|---|
| 1 | 0.5 | 60 | 25 |
| 2 | 0.5 | | |
| 3 | 0.5 | | |
| 4 | | | |
| 5 | 0.5 | | |
| 6 | 0.5 | | |
| 7 | 1.6 | | |
| 8 | 3.8 | | |
| 9 | 5.3 | | |
| 10 | 4.9 | 67 | 29 |
| 11 | | | |
| 12 | 5.5 | | |
| 13 | 9.8 | | |
| 14 | 6.5 | | |
| 15 | 5.4 | | |
| 16 | 4.6 | 67 | 31.5 |
| 17 | 3.2 | | |
| 18 | | | |
| 19 | 3.0 | | |
| 20 | 3.0 | | |
| 21 | 1.3 | 70 | 37 |

Normal values: Percent
  Reticulocytes _____ 0.5 to 1.5
  Haemoglobin _____ 90 to 100
  Haematocrit _____ 36 to 54

EXAMPLE 6

A female patient suffering from pernicious anaemia was treated for 13 days by the oral administration of 40 micrograms of crystalline cyanocobalamin per day.

At the end of this period she was given orally per day an amount of the freeze dried preparation described in Example 3 (mixed with an inert diluent) equivalent to 40 micrograms of cyanocobalamin for 12 days.

Figure 2:
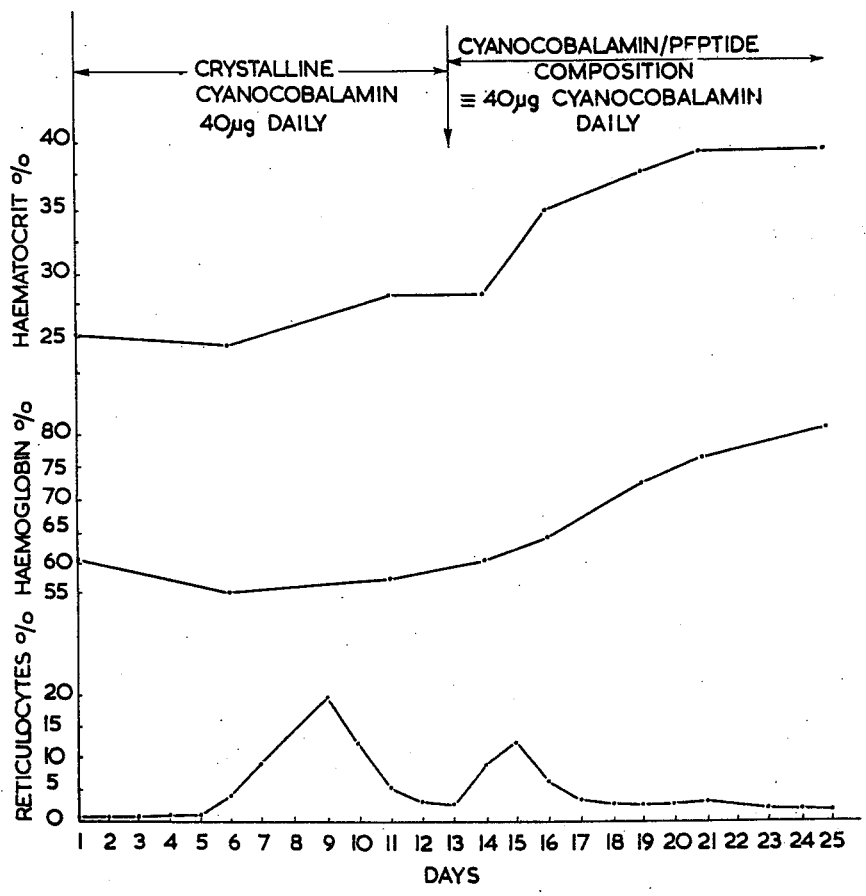

Examinations were carried out on samples of the patient's blood throughout the period of treatment and the results of these examinations are given in Table 2 and in FIGURE 2.

It will be seen that no improvement of the haemoglobin content of the blood or in the haematocrit value resulted during the treatment with crystalline cyanocobalamin but these values improved considerably upon administration of the cyanocobalamin/peptide composition of the present invention.

An increase in the number of reticulocytes took place during treatment with crystalline cyanocobalamin showing stimulation of the blood forming tissue of the bone marrow. However, the further increase in the number of reticulocytes after treatment with the cyanocobalamin/peptide composition shows that the cyanocobalamin/peptide composition of the present invention is a more effective stimulant of this tissue than is cyanocobalamin itself when given orally.

Table 2

| Days Treatment | Reticulocytes, Percent | Haemoglobin, Percent | Haematocrit, Percent |
|---|---|---|---|
| 1 | 0.5 | 60 | 26 |
| 2 | 4.0 | | |
| 3 | 0.6 | | |
| 4 | 0.7 | | |
| 5 | 1.0 | | |
| 6 | 4.4 | 55 | 24 |
| 7 | 8.0 | | |
| 8 | | | |
| 9 | 19.0 | | |
| 10 | 13.0 | | |
| 11 | 5.5 | 57 | 28 |
| 12 | 3.9 | | |
| 13 | 2.6 | | |
| 14 | 9.2 | 60 | 28 |
| 15 | 12.0 | | |
| 16 | 6.8 | 64 | 35 |
| 17 | 3.5 | | |
| 18 | 2.5 | | |
| 19 | 2.5 | 72 | 38 |
| 20 | 2.6 | | |
| 21 | 2.7 | 76 | 39 |
| 22 | | | |
| 23 | 1.7 | | |
| 24 | 1.7 | | |
| 25 | 1.0 | 80 | 39 |
| 26 | 1.0 | | |

I claim:

1. A process for the preparation of cobalamin/peptide compositions effective on oral administration against pernicious anaemia which comprises mixing a cobalamin and peptide present in crude corn steep liquor.

2. A process as claimed in claim 1 wherein the peptide is obtained by extraction from corn steep liquor into an organic solvent and re-extraction into water.

3. A process as claimed in claim 1 wherein a peptide containing extract of corn steep liquor is contacted with a substance furnishing cyanide ions before the addition of a cobalamin.

4. A process as claimed in claim 1 wherein the peptide contains a residue of at least one of the following amino acids: Glutamic acid, aspartic acid, glycine, valine, proline, arginine, cysteine or cystine, serine, alanine, leucine, isoleucine, phenylalanine, lysine, histidine, tyrosine and tryptophane.

5. A process for the preparation of compositions suitable for the oral treatment of pernicious anaemia comprising mixing in solution a cobalamin with a peptide obtained from corn steep liquor, precipitating from the mixture a cobalamin/peptide composition and thereafter mixing the cobalamin/peptide composition with an inert diluent.

6. A process as claimed in claim 1, wherein the cobalamin/peptide composition is obtained in solid form by precipitation from an aqueous solution containing it by addition of a compound selected from the group consisting of ammonium sulphate and acetone.

7. A process as claimed in claim 1, wherein sufficient cobalamin is mixed with the peptide to give a composition having an optical density ratio at wavelengths of 278 mu and 361 mu in the range 0.7 to 1.3, and having a cobalamin/peptide ratio in the range 1:3 to 1:9.

References Cited in the file of this patent

UNITED STATES PATENTS 2,787,578    Lightfoot et al. _____ Apr. 2, 1957

OTHER REFERENCES

Heathcote et al.: The Lancet, vol. I, No. 7028, May 10, 1958, pages 982–987.

Latner: The Lancet, vol. I, No. 7209, May 17, 1958, p. 1077.